United States Patent [19]

Haubenwallner

[11] Patent Number: 4,773,495

[45] Date of Patent: Sep. 27, 1988

[54] DRIVE MOTOR, WHICH IS SUPPLIED BY AN ENERGY SOURCE, FOR DISK-SHAPED OR WHEEL-SHAPED MEMBERS WITH A CONTROL MECHANISM

[76] Inventor: Gerhard Haubenwallner, Griesheimer Strasse 12, 3370 Ybbs a. d. Donau, Austria

[21] Appl. No.: 18,328

[22] Filed: Feb. 24, 1987

Related U.S. Application Data

[62] Division of Ser. No. 702,519, Feb. 19, 1985, Pat. No. 4,671,524.

[30] Foreign Application Priority Data

Feb. 24, 1984 [AT] Austria .................................. 622/84

[51] Int. Cl.[4] ................................................ B60K 1/02

[52] U.S. Cl. .................................... 180/65.2; 180/6.5; 180/68.5; 180/907; 280/212; 280/242 WC; 280/289 WC; 403/349

[58] Field of Search ....... 280/212, 242 WC, 289 WC; 180/65.2, 65.5, 6.5, 907, 220, 221, 222, 68.5; 403/349, 361, 383

[56] References Cited

U.S. PATENT DOCUMENTS

| | | | |
|---|---|---|---|
| 2,219,907 | 10/1940 | Ross | 403/349 |
| 3,100,860 | 8/1963 | Rosethal | 180/6.5 |
| 3,351,148 | 10/1965 | Solomon | 180/6.5 |
| 3,770,073 | 11/1973 | Meyer | 180/907 |
| 3,786,887 | 1/1974 | Rosenthal et al. | 180/6.5 |
| 3,889,773 | 6/1975 | Chant | 180/65.2 |
| 3,912,032 | 10/1975 | Benz et al. | 180/907 |
| 3,912,039 | 10/1975 | Ordemann | 180/220 |
| 3,955,639 | 5/1976 | Cragg | 180/6.5 |
| 4,140,192 | 2/1979 | Sharpe | 180/6.5 |
| 4,323,133 | 6/1983 | Williams | 280/242 WC |
| 4,386,672 | 6/1981 | Coker | 180/907 |
| 4,516,647 | 5/1985 | Novak | 280/212 |

FOREIGN PATENT DOCUMENTS

| | | | |
|---|---|---|---|
| 1924756 | 11/1969 | Fed. Rep. of Germany | 180/907 |
| 2252080 | 6/1975 | France . | |

*Primary Examiner*—David M. Mitchell

*Assistant Examiner*—Eric D. Culbreth

*Attorney, Agent, or Firm*—Flynn, Thiel, Boutell & Tanis

[57] ABSTRACT

A drive mechanism, which is supplied by an energy source, for a wheel of a personal vehicle of the kind including wheelchairs, wheelchair towing devices, bicycles and the like, and having a user support for supporting a user thereon for movement with said vehicles. A drive motor is drivingly connectible to the wheel. An energy control means controls energization of the motor. A releasable device releasably locates the drive motor in driving relation with the wheel in a location on the vehicle within reach of a user on the user support for connection and disconnection of the drive motor with respect to said vehicle by a user on the user support, the latter including a quick release device for facilitating that connection and disconnection.

7 Claims, 5 Drawing Sheets

FIG. 1
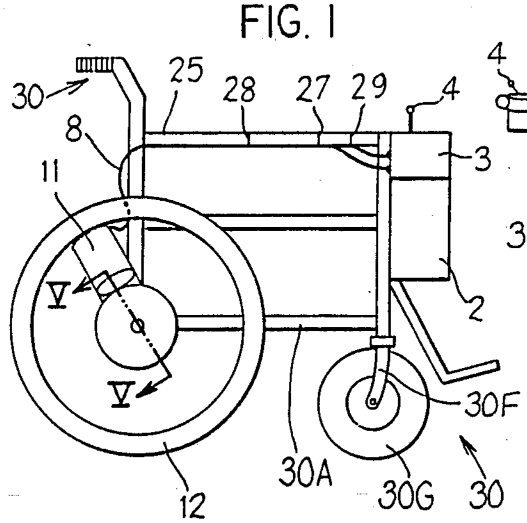
FIG. 3
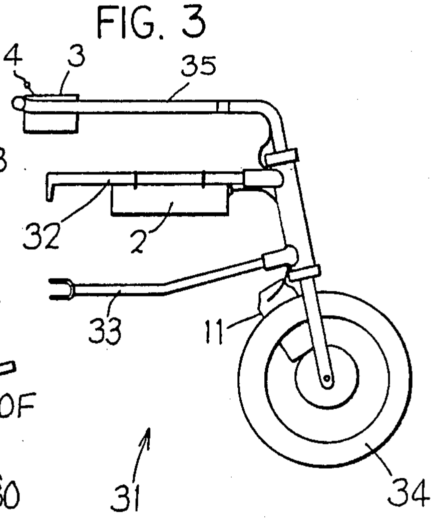
FIG. 2
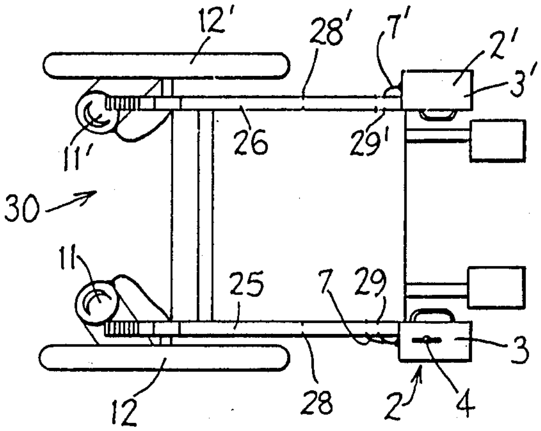
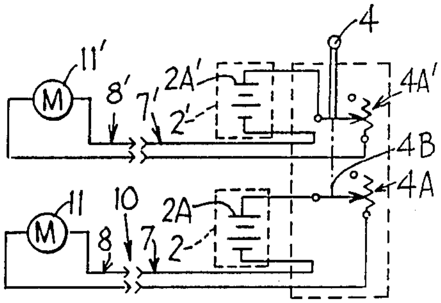
FIG. 4 a
FIG. 4
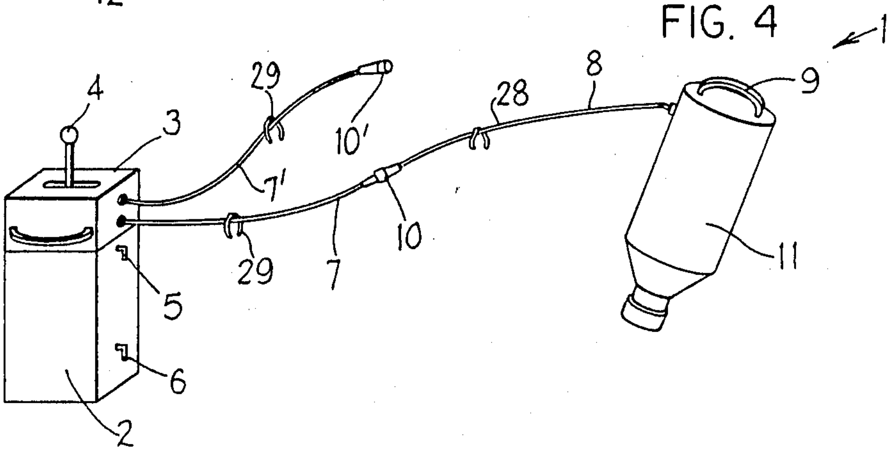

FIG. 8d
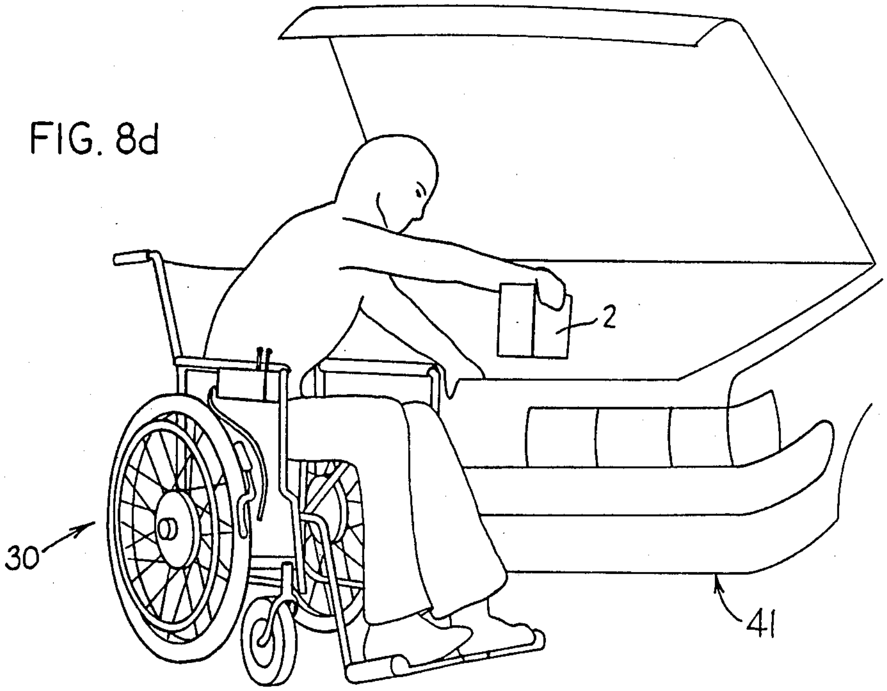
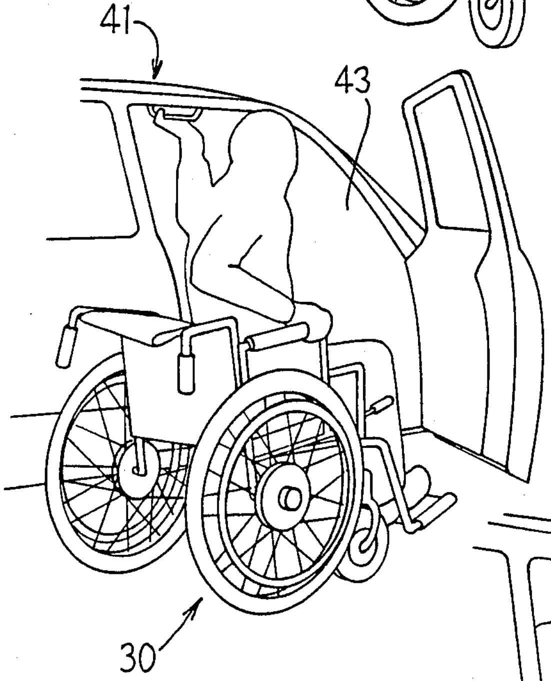
FIG. 8e
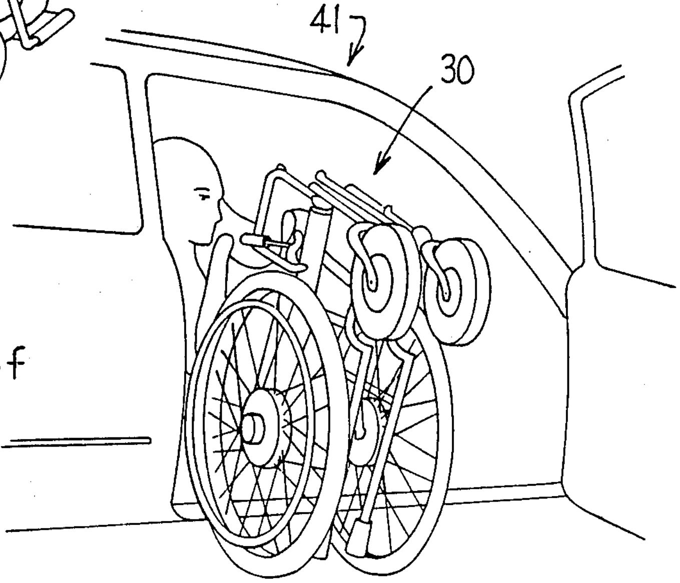
FIG. 8f

DRIVE MOTOR, WHICH IS SUPPLIED BY AN ENERGY SOURCE, FOR DISK-SHAPED OR WHEEL-SHAPED MEMBERS WITH A CONTROL MECHANISM

This is a division of application Ser. No. 702,519, filed Feb. 19, 1985 now U.S. Pat. No. 4,671,524.

FIELD OF THE INVENTION

The invention relates to a drive motor, which is supplied by an energy source, for driving disk-shaped or wheel-shaped members under control of a control mechanism.

BACKGROUND OF THE INVENTION

The purpose of the invention is to construct a drive unit for wheel or disk-shaped members, for example in normally manually powered personal vehicles, wheelchairs, bicycles and the like, which drive unit comprises an energy source, a drive motor, and if desired a one- or two-piece transmission, the parts thereof being of a low weight and small structural size, which parts are interconnected for example through separable connectors so that the drive unit can be operated mainly by weak, ill and/or handicapped persons with one hand, without thereby causing a reduction in function and performance.

The invention attains this purpose by operatively connecting the drive motor to the disk-shaped or wheel-shaped member, if desired, by means of a transmission, or drive train, and by the user being able to easily releasably fix it on the vehicle while he is in his normal rest position on the vehicle.

A further development of the invention is that the drive motor can be attached to the transmission, which is in constant connection with the wheel or disk-shaped member. However, it is also contemplated that the drive motor can be attached along with the transmission, as a unit, to the wheel or disk-shaped member. It is also contemplated that the drive motor can be operatively connected along with a part of the transmission, as a unit, to the remaining transmission part which is arranged on the wheel or disk-shaped member.

Furthermore, it is inventively possible that the drive motor can be attached directly to the wheel or disk-shaped member, that the drive motor is an electric motor, that the energy source is a battery, which consists of individual battery elements which are separated from each other on the vehicle, and that the battery elements are connected to one another by means of cables and/or plug connections and can be operated by means of a common control handle.

Another inventive possibility exists by the energy source being a small generator, or the drive motor being a gasoline motor.

It is furthermore inventively possible that the transmission is a conventional drive train like for example as gear drive, a friction gear, a belt drive or a chain drive, a linkage or a hydraulic gearing.

In a hydraulic gearing it is for example possible to arrange the drive motor with a hydraulic pump unit on a part which is remote from the vehicle wheel, whereby a hydraulically driven turbine wheel is fixedly connected to the rim of the vehicle wheel. The supplying for example of oil occurs then through hoses with quick disconnect couplings, of the kind which during disconnection seal closed immediately, so that no oil leakage occurs.

A further possibility is offered by a small generator, which is connected to battery elements, which in turn supply their energy (which is constantly supplemented by the generator) to a disk motor which is for example centrally and directly placed into the vehicle wheel hub where it is releasably fixed by suitable lockable clamping means.

Due to the easy handling of the drive elements which are arranged separately from one another and which are connected with one another by means of cables and/or plug connections (with gasoline motors also through cables and gasoline lines) it is easily possible for a single person, who for example is handicapped and depends on a wheelchair for mobility, to make out of a normal collapsible wheelchair an electrically driven wheelchair. This is of particularly great advantage for older wheelchair users, who as a further transporting means also use a car, since they thus become largely independent from any need for an attending person.

Thus the inventive wheelchair is a collapsible wheelchair, on which, with a few manipulations, an electrical drive unit and the associated battery or a small generator can be detachably mounted.

Thus out of a collapsible wheelchair with its advantages is made an electrical wheelchair with its advantages.

The inventive drive unit comprises one or two motors, which are mounted on the wheelchair, for example by attaching to the wheel or wheels, and further comprises battery boxes with a control which are mounted or attached for example to the front ends of the arm rests of the wheelchair. When using a single motor, a steering means is to be provided. The parts of the drive unit are designed such with respect to weight, that they can easily be mounted, thus for example attached or removed, by a handicapped person sitting in the wheelchair, or by an attending person. By these possibilities of change are overcome the disadvantages of the electric wheelchair, namely that it is not collapsible and therefore, and also because of its great weight, is difficult to load and cannot at all by the handicapped person be loaded into a car or other transporting means. Thus a handicapped person can travel with the inventive wheelchair electrically to his car, can remove the drive unit, store it in the car trunk and can then get into the car like he would with a normal collapsible wheelchair. chair.

The batteries can be stored in the car such that they are recharged by the car generator during driving.

The inventive wheelchair can be used in a home like a normal wheelchair, the wheelchair does not need to be modified when leaving the home, and the drive unit is mounted on the wheelchair only when the wheelchair user wishes to move by means of the electric drive. Therefore storage space for a second wheelchair is not needed. The inventive wheelchair makes it possible for a number of handicapped persons to move for the first time with a car or other transporting means without any attending person. Furthermore, the possibility of use of the inventive wheelchair is increased to a greater circle of persons compared with presently existing wheelchairs due to the possibility of being able to transport it easily with a car.

Furthermore, it is possible with the inventive drive mechanism to also drive bicycles, baby carriages, hand wagons, and the like, and even for example, with a friction transmission, potter's wheels, grinding disks and the like.

BRIEF DESCRIPTION OF THE DRAWINGS

The invention will be described in greater detail in the drawings in connection with one exemplary embodiment.

In the drawings:

FIG. 1 is a side view of the inventive drive unit as a drive for a foldable wheelchair, FIG. 2 is a top view of said wheelchair, FIG. 3 is a side view of the inventive drive unit on a towing device (tractor) for wheelchairs, FIG. 4 illustrates the inventive drive unit separate from a means which is to be driven, FIG. 4*a* is an electrical schematic diagram of one embodiment of the inventive drive unit, FIGS. 8*a* to 8*f* illustrate the use of an inventively designed wheelchair by a handicapped car driver.

DETAILED DESCRIPTION

Figure 5:
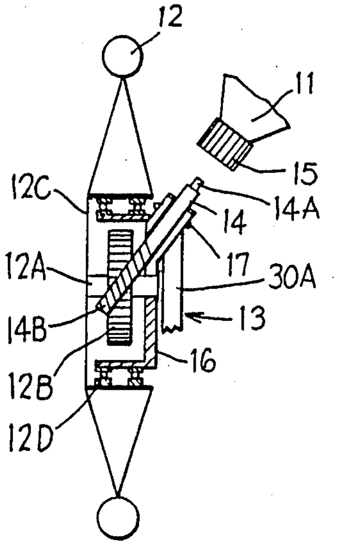
FIG. 5 is a cross-sectional view, taken substantially on the line V—V of FIG. 1, of a gear transmission which is integrated into a wheel, onto which gear transmission the motor is mounted and fixed.

Turning to FIGS. 4 and 4*a*, the inventive drive mechanism 1 comprises a battery carrier 2 comprising a conventional electric storage battery 2A with a control unit 3 and an associated control handle 4. The control handle 4 is manually shiftable to control the speed at which an electric motor 11 is driven by the battery 2A, e.g. by shifting the setting of a conventional potentiometer and on-off switch assembly 4A (FIG. 4*a*) connected in circuit loop with the battery 2A and motor 11. A cable 7, 8 connects the motor 11 to the control unit 3 to complete such circuit loop. The cable 7, 8 here includes a separate coupling 10 in the midportion thereof. The battery carrier 2 can be removably suspended, for example by engaging hooks 5, 6 thereon in spaced receiving slots, on a vehicle to be driven, for example on a bicycle, wheelchair or the like. The motor 11 is provided with a handle 9.

Figure 5A:
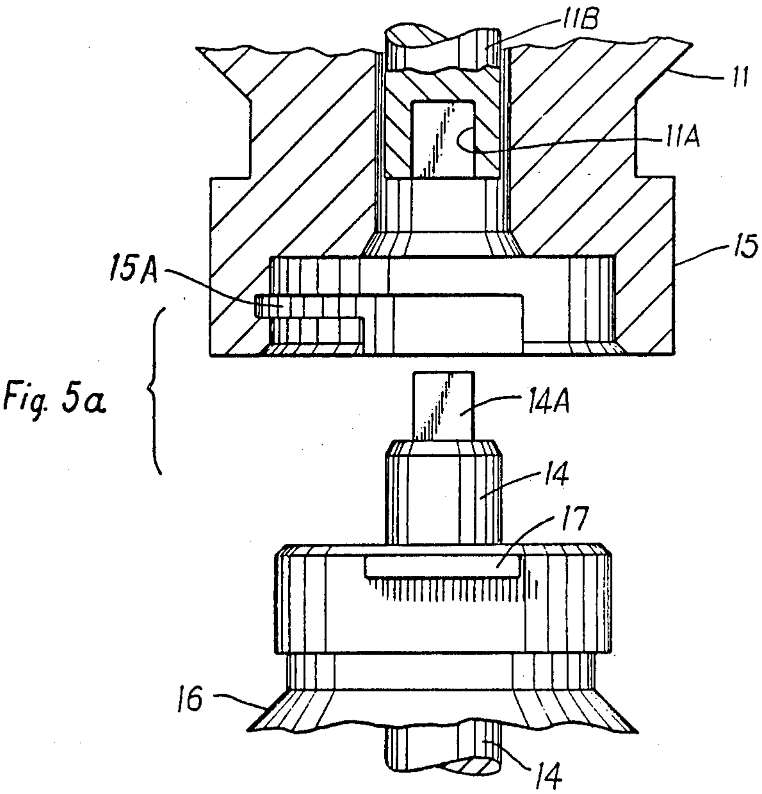
FIG. 5*a* is an enlarged partially broken fragment of the apparatus of FIG. 5.

In the embodiment of FIG. 5, the motor 11 is releasably drivingly engageable to a shaft 14 of a gear drive transmission 13, which is located in the hub 12C of a wheel 12 which is to be driven. The shaft 14 is here provided with a tenon-like flat-sided end 14A (FIGS. 5 and 5*a*) releasably axially received in and rotatably driveable by a corresponding mortise-like flat-sided recess 11A in the opposed end of the recessed output shaft 11B of the motor 11. The motor 11 is releasably fixed by a twist lock 15 to a thread 17 which is provided on the housing 16 of the transmission 13. The twist lock 15 preferably pilots the axially advancing motor 11 onto the transmission housing 16 and shaft 14, to engage the flatted shaft ends 11A and 14A, whereafter a partial twist of the motor 11 by its handle 9 circumferentially advances the thread 17 in the groove 15A of the twist lock 15 to releasably fix the motor 11 on the transmission 13 for rotatably driving the wheel 12. In the embodiment shown, the twist lock 15 and thread 17 conveniently comprise a form of bayonet connection. The transmission housing 16 is fixed to the frame of the vehicle to be propelled, here for example the frame 30A of the wheelchair 30 of FIGS. 1, 2 and 8*a*–8*f*. Bearings 12D rotatably support the wheel 12 at its hub 12C on the transmission housing 16. The transmission 13 here includes a driving worm gear 14B fixed on the lower end of the shaft 14 and drivingly engaging a driven gear 12B fixed on the wheel shaft 12A for rotatably driving the wheel hub 12C and wheel 12 with respect to the wheelchair frame 30A. Thus, the motor 11 is installable on and removable from the wheelchair 30 quickly and easily.

Figure 6:
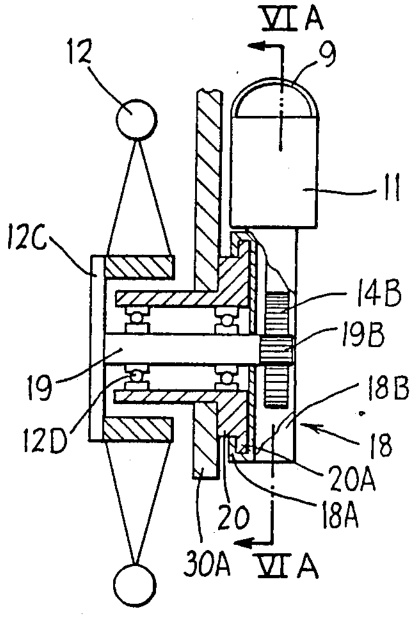
FIG. 6 is a cross-sectional view similar to FIG. 5 but showing a modification.

The FIG. 6 modification differs in that a modified gear transmission 18 forms a single structural unit with the motor 11, which unit 11, 18 is moved into driving engagement with the shaft 19 of the wheel 12 and is removably fixed against rotation on the wheel bearing support 20 fixed on the wheelchair frame 30A. In the embodiment shown in FIGS. 6 and 6*a*, the wheel 12 has its central shaft 19 extending loosely through the wheel hub 12C and supported rotatably by bearings 12D in the hollow wheel bearing support 20. The wheel shaft 19 is provided on its inner end with a driven gear 19B rotatable to rotate the wheel 12. The transmission 18 includes a driving worm gear 14B rotatably driven by the motor 11 and drivingly engageable with the driven gear 19B.

Figure 6A:
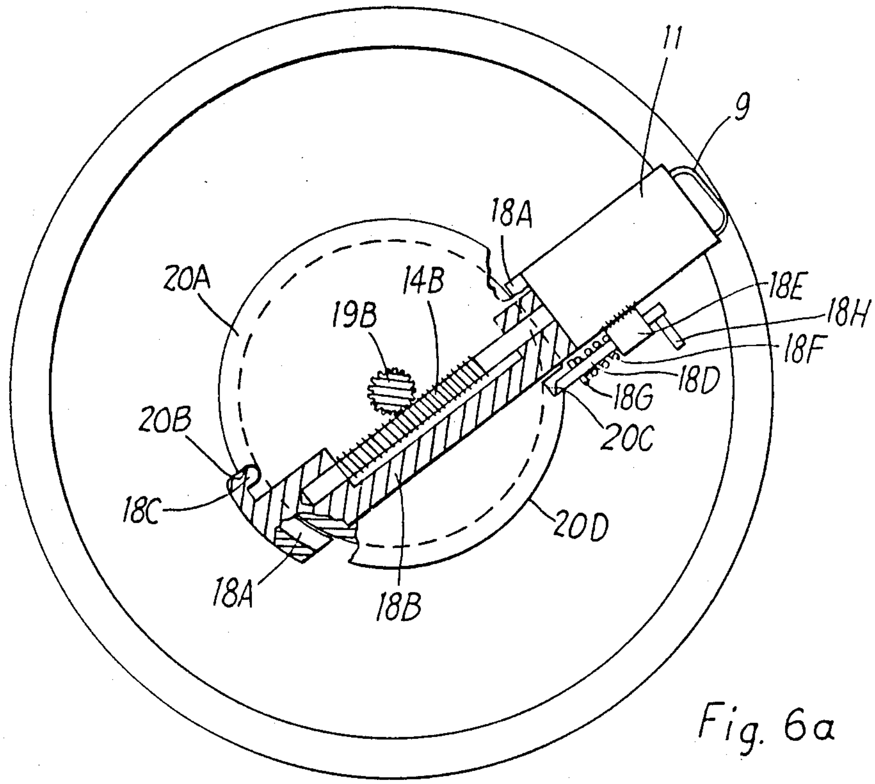
FIG. 6*a* is an enlarged cross-sectional view substantially taken on the line VIA—VIA of FIG. 6.

To removably affix the motor-transmission unit 11, to the bearing support 20, against axial relative movement, a radially outward extending flange 20A on the axially inner part of the bearing support 20 traps axially outward thereof opposed radially inward extending flanges 18A on the axially outward side of the transmission housing 18B. To hold the worm 14B in driving engagement with the wheel shaft gear 19B, and hence to releasably fixedly locate the motor-transmission unit 11, 18 with respect to the axis of wheel shaft 19, the remote (lower in FIG. 6*a*) end of the transmission housing 18B has a hooklike, reversely extending, finger 18C engageable in a notch 20B in the edge of the transmission housing flange 20A, and a pin 18D releasably received in an oppositely extending notch 20C in the opposite, upper in FIG. 6*a*, portion of the bearing support flange **20*a*. The pin 18D is disengageable from the notch 20C to allow the motor-transmission unit 11, 18** to be pivoted downward (clockwise in FIG. 6*a*) away from the wheel shaft gear 19B, whereupon downward and leftward shifting of the unit 11, 18, substantially along the axis of the worm 14B will disengage the finger 18C from the notch 20B and thus release the unit 11, 18 from the wheelchair. To facilitate release of the pin 18D, in the embodiment shown, such pin is axially slidable, substantially parallel to the worm 14B in a boss 18E fixed on the side of the motor 11 a compression spring 18F trapped on the pin 18D between the boss 18E and a protrusion 18G near the inner end of the pin 18D resiliently urges the pin 18D inward of the notch 20C. A handle 18H on the outer end of the pin 18D is engageable by the user to pull the pin 18D outward from the notch 20C against the bias of the spring 18F to thereby release the unit 11, 18 from its engagement on the bearing support 20. Installation of the unit 11, 18 on the bearing support 20 is done by a reversal of the above steps, namely by first engaging finger 18C in notch 20B, pivoting the unit 11, 18 upward to engage the worm 14B with the wheel shaft gear 19B and wherein the inner end of the pin 18D slides along the periphery 20D of the flange 20A until it drops into the notch 20C in response to urging of the spring 18F. The radially inner end of the pin 18D may be beveled, as shown in FIG. 6a to facilitate forcing outward of the pin 18D against the spring 18F as the inner end of the pin 18D slides upwardly along the periphery 20D of the bearing support 20A. Again, the motor-transmission unit 11, 18 is installable on and removable from the wheelchair 30 quickly and easily.

Alternately, the motor 11 and transmission 18 could be constructed as a so-called disk motor, not shown, namely as a disk-shaped motor which can be built into the hub of the wheel 12. However, if the motor and transmission thus constructed as a so-called disk motor are permanently installed in the hub of the wheel 12, such would add to the weight of the wheelchair and to the bulk thereof which may interfere with folding of the wheelchair and movement of the wheelchair by a disabled user into and out of his or her car in a conventional manner. Thus, a wheelchair with the motor and transmission permanently built into the hub of the wheel is not regarded as an equivalent to the above-described embodiments of FIGS. 5 and 6.

Figure 7:
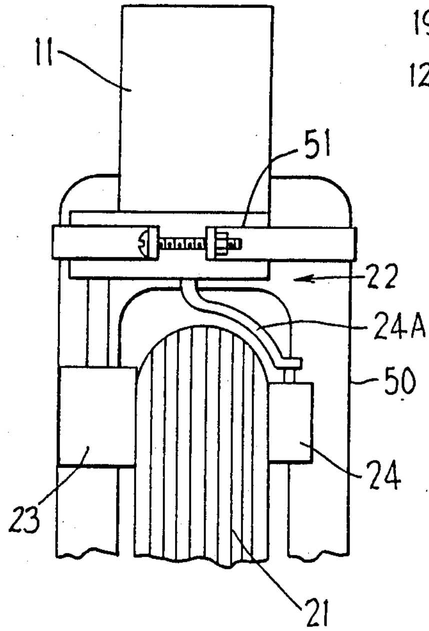
FIG. 7 illustrates a modified drive means comprising a friction transmission.

Alternately, as seen in FIG. 7, a wheel 21 can also be driven by the motor 11 equipped with a friction transmission 22, whereby a friction drive wheel 23 and a spring-loaded (at 24A) counterwheel 24 are placed to grip therebetween the wheel 21. The motor 11 is releasably fixed to the frame of the vehicle. For example, in the case of a conventional bicycle the motor is releasably fixed to its fork 50 by means of releasable clamping locks, as at 51. The battery carrier 2 can be mounted on the bicycle frame (much as in FIG. 3) or on a conventional bicycle storage rack and the control mechanism 3, 4 can be mounted on the handle bar (much as in FIG. 3).

In the case of a collapsible wheelchair 30 of FIGS. 1 and 2 a single control unit 3 containing a pair of potentiometers 4A, 4A' actuated by a single handle 4 is fixed on an arm rest 25. Two battery carriers 2, 2' are attached for example to the front sides of respective arm rests 25, 26 (FIG. 2) whereby the cables 7, 8, 7', 8' which variously connect control unit 3 with the battery carriers 2, 2' and the motors 11, 11', are secured by means of cable clips 28, 28', 29, 29' on the tubular profile of the wheelchair arm rests 25, 26. In the embodiment shown in FIGS. 1, 2 and 4a, a common control handle 4 controls two potentiometer and switch assemblies 4A and 4A' simultaneously and thus simultaneously controls the speed of the motors 11 and 11' driving the respective wheelchair wheels 12 and 12'. In other words, each wheel 12 and 12' has its own circuit loop 2A, 4A, 11 and 2A', 4A', 11' respectively. It is, however, contemplated that the FIG. 4a system can be modified by eliminating the mechanical linkage 4B between the potentiometer-switch assemblies 4A and 4A', such that each assembly would have its own separately actuable handle 4 and 4' (as in FIG. 8a). Due to that modification, the speed of the wheels 12 and 12' would be individually controlled to enable steering of the wheelchair by rotating the wheels 12 and 12' at different speeds. If this separate control of the assemblies 4A and 4A' is desired, the assemblies 4A and 4A' may be located in separate control units 3 and 3' (the latter not being shown) with each such control unit being mounted atop its own battery carrier on its own respective arm of the wheelchair like at 3, 2 in FIGS. 1 and 2.

If a single control handle 4 actuates linked assemblies 4A and 4A' as specifically shown in FIG. 4a, steering of the wheelchair can be accomplished by manual retardation of one or the other of the wheels 12 and 12'.

A single motor 11, battery carrier 2, control unit and handle 4, connected in circuit loop in the manner shown in the bottom half of FIG. 4a, can be used to drive the wheelchair through only one wheel 12 if suitable means are provided for steering, for example an upstanding rigid steering wand (not shown) rigidly fixed to the fork 30F of the steerable front caster wheel 30G (FIG. 1).

Figure 8A:
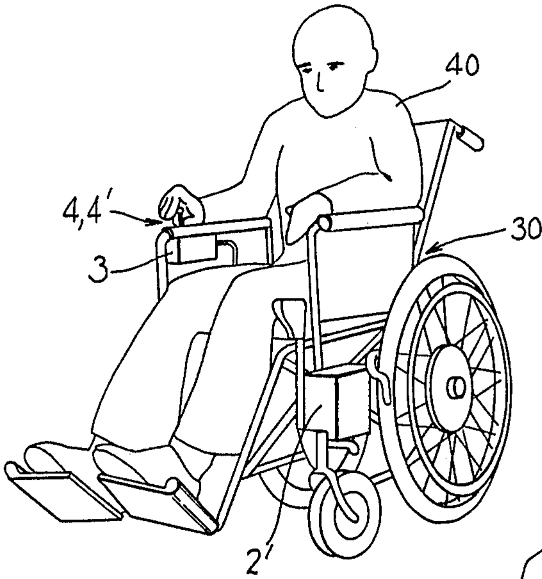
Figure 8B:
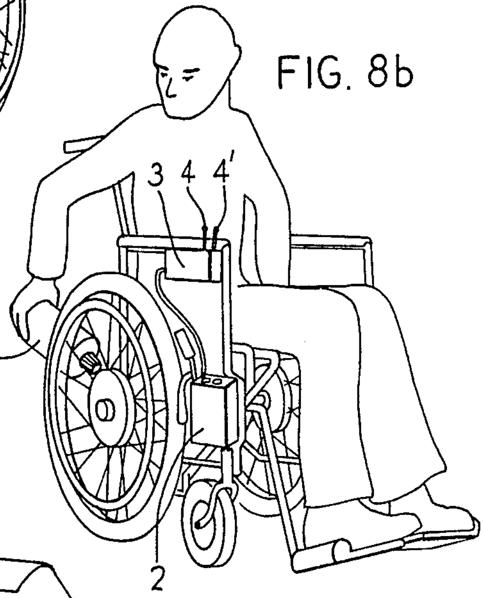
Figure 8C:
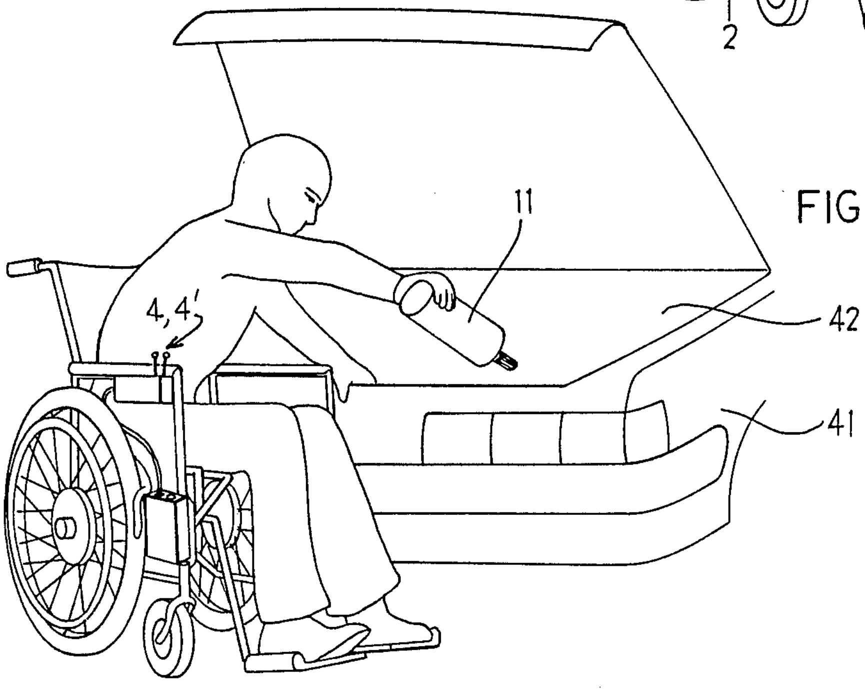

As it is illustrated in FIGS. 8a to 8f, it is possible for a handicapped person 40 to motor drive with an inventive wheelchair 30 to a car 41 as in FIG. 8a, to there remove the attachable motor 11, or motors 11, 11' as in FIG. 8b, and then to load same into the trunk 42 of the car 41 (FIG. 8c). The handicapped person 40 removes then the attachable battery 2 or batteries 2, 2' as in FIG. 8d and also loads same into the trunk 42. If desired, the control unit 3, or control units if more than one are provided, can similarly be removed from the wheelchair and loaded into the trunk 42 of the car 41. Thereafter he manually moves the wheelchair 30 forward to the driver's or passenger's door 43 of the car 41 as in FIG. 8e, gets in there and collapses the wheelchair 30 for loading into the inside of the car 41 as in FIG. 8f.

A different possibility for a wheelchair drive is shown in FIG. 3 wherein a towing device (tractor) 31 having a wheel 34 is releasably fixed to the front of the wheelchair 30, by any convenient means such as a suitable fork 32 and rod 33. The battery carrier 2 is then arranged for example on the fork 32 with the control unit 3 and lever 4 arranged on a steering means 35 (here a handle bar) connected to steer the wheel 34 like on a conventional bicycle. Again, after the use of the towing device 31, the motor 11 and the battery element 2 are removed and are for example stored in the trunk of a car. Thereafter, the fork 32, rod 33 and steering means 35 are unlocked and are for example pulled off or collapsed toward the wheel 34, which permits storing also the towing device 31 in the smallest space.

I claim:

1. A wheel chair comprising:

a frame;

a seat on said frame for supporting a person who is to use the wheel chair, said seat having a bottom and a back rest generally upstanding from the rear portion of said bottom;

wheels supporting the frame for movement along the surface, said wheels including a pair of drive wheels and means locating same on opposite sides of said frame adjacent said rear portion of said seat within easy hand reach of a person supported in seated relation by said seat bottom and back rest;

a pair of driven units fixed on said wheel chair adjacent corresponding ones of said drive wheels and having a driven means connected in rotational driving relation with corresponding said drive wheels for rotating the latter and thereby propelling the wheel chair upon actuation of said driven means;

a pair of portable driving units each having driving means;

motion transmitting means releasably interengaging the driving means of each said driving unit with the driven means of a corresponding said driven unit for rotatably driving the corresponding said wheel upon actuation of said driving unit;

means for actuating said driving units;

mounting means releasably fixedly mounting each driving unit on a corresponding driven unit on said frame adjacent the corresponding drive wheel, said mounting means including hand engagable and hand releasable latch means interposed between each said driving unit and driven unit fixed on said wheel chair frame, said latch means being of a kind engagable and releasable without tools, said driving units each including handling means (1) located within easy hand reach of a person supported in seated relation by said seat bottom and back rest and (2) graspable and movable by the hand of the so seated person without tools for (1) releasing said latch means and (2) removing the corresponding said driving unit from engagement with said driven unit and all support by said wheel chair frame, said wheel chair having arm rests on the side thereof above the level of the bottom of the seat, battery packs, at least one of which is surmounted by a control unit, said battery packs being releasably fixed to the front of respective arm rests, tool-less quick disconnect means supporting said battery packs on said arm rests, and tool-less quick disconnect electric cables interconnecting said battery packs and control unit and motors.

2. The apparatus of claim 1 in which said driving unit compries a motor having a casing and a rotatable shaft, said driven unit comprising a housing fixed on said wheel chair frame and a rotatably drivable shaft, said shafts having releasably interengaging parts defining said motion transmitting means.

3. The apparatus of claim 2 in which said mounting means comprises axially telescoped male and female pilot means on said casing and housing, said latch means comprising bayonet connecting means on said male and female pilot means, said bayonet connection including a part circle thread and coacting groove releasably engaged to secure said motor casing on said housing fixed on said frame, said handling means comprising an outer surface of said motor casing projecting up behind said back rest from near the center of said wheel and hand twistable and upwardly pullable by said seated person to release said bayonet connection.

4. The apparatus of claim 4 in which said driven unit includes a member fixed on said frame and supporting a portion of said motion transmitting means, said driving unit comprising a motor having a housing extending substantially parallel to the plane of the corresponding wheel, said housing and member having hook and notch connecting means releasably fixing one end of said motor housing on said member.

5. The apparatus of claim 4 in which said member is fixed to said frame across the rotational axis of the corresponding wheel, said motor housing spanning said member, said hook and notch connecting means including a hook and notch connection releasably connecting one end of said member to said motor housing, a spring loaded pin and notch connection releasably fixing the other end of said member to said motor housing, said spring loaded pin and notch connection including handle means actuable by the hand of the person supported by said seat and back rest to release said pin and notch connection and adjacent part of said motor housing engagable by the hand of such person supported by said seat bottom and back rest to thereafter lift said driving unit away form said driven unit member.

6. A drive mechanism for a personal vehicle of the kind having a frame, a user support on the frame for seating a user thereof, and a wheel supporting the frame and drivable to propel the vehicle, said drive mechanism comprising:

a drive motor having a casing and a driving shaft;

energy control means for controlling energization of said drive motor;

a driven unit comprising a housing fixed with respect to said frame and a driven member connected in driving relation to said wheel;

mounting means releasably supporting said casing on said housing and comprising axially releasably telescope male and female pilot means on said casing and housing, said mounting means including a bayonet connection on said male and female pilot means including a thread and coacting groove releasably engaged to fixedly support said drive motor casing on said housing and hence on said vehicle frame, said driving shaft and driven member having means releasably engaged in driving relation in response to establishing said bayonet connection, said driving motor casing having means hand engagable by a person normally seated on said user support for disengaging said bayonet connection and lifting said drive motor away from said vehicle, said bayonet connection having an axis extending rearward, upward and laterally inward from the axis of the corresponding wheel, said vehicle having a pair of wheels similarly equipped with drive motors and located below and adjacent the rear edge of the user support to locate said drive motors below the shoulders of a user normally seated on said user support and within easy hand reach of said user.

7. The apparatus of claim 6 in which said vehicle is a wheel chair, said user support is seat located centrally of said frame and facing forward therefrom, said wheels being the rear wheels of said wheel chair, the frame of said wheel chair having arm rests on opposite sides thereof, said energy control means including battery packs mounted on the front of respective ones of said arm rest and at least one manual control associated therewith, said battery packs being releasably connected to the frame of said wheel chair in a tool-less quick disconnect manner, and electric cables incorporating tool-less quick disconnect means for normally connecting said control, battery packs and motors, such that a user seated in said wheel chair can, without tools, and by hand, remove said drive motors and battery packs from said chair.

* * * * *

UNITED STATES PATENT AND TRADEMARK OFFICE
CERTIFICATE OF CORRECTION

PATENT NO. : 4 773 495

DATED : September 27, 1988

INVENTOR(S) : Gerhard Haubenwallner

It is certified that error appears in the above-identified patent and that said Letters Patent is hereby corrected as shown below:

Column 7, line 45; change "claim 4" to ---claim 1---.

Column 8, line 7; change "form" to ---from---.

Column 8, line 10; change "thereof" to ---thereon---.

Signed and Sealed this

Fifth Day of September, 1989

Attest:

DONALD J. QUIGG

*Attesting Officer*

*Commissioner of Patents and Trademarks*